United States Patent [19]

Smith

[11] 4,152,696

[45] May 1, 1979

[54] MULTI-FUNCTION CONTROL CIRCUIT

[75] Inventor: William V. Smith, Memphis, Tenn.

[73] Assignee: Lectrolarm Custom Systems, Inc., Memphis, Tenn.

[21] Appl. No.: 851,812

[22] Filed: Nov. 16, 1977

[51] Int. Cl.[2] .......... H04Q 9/06

[52] U.S. Cl. .......... 340/172; 307/350; 340/147 MD

[58] Field of Search .......... 340/172, 147 MD, 162; 307/235 R

[56] References Cited

U.S. PATENT DOCUMENTS

| | | | |
|---|---|---|---|
| 3,932,714 | 1/1976 | Guimier et al. | 340/172 X |
| 4,028,620 | 6/1977 | Kitagawa et al. | 340/172 X |
| 4,070,650 | 1/1978 | Ohashi et al. | 340/172 |

*Primary Examiner*—Donald J. Yusko

*Attorney, Agent, or Firm*—LeBlanc & Shur

[57] ABSTRACT

A control system capable of selectively providing one of a plurality of control signals with each signal corresponding to a particular predesignated function. The output signals from the control system are generated in response to constant voltage input signals. The system includes an input circuit and a control circuit. The input circuit is coupled to the control circuit through a single transmission line over which a constant level voltage is transmitted. The voltage level of the input signal which is transmitted is selected from among a plurality of predetermined levels in dependence upon the control function to be achieved. The control circuit, in turn, receives the input signals and in response thereto will activate one of a plurality of switches for providing a corresponding output signal which serves to enable an appropriate control function.

9 Claims, 3 Drawing Figures

MULTI-FUNCTION CONTROL CIRCUIT

BACKGROUND OF THE INVENTION

The present invention involves a control system for providing a plurality of control signals for selectively enabling a corresponding plurality of control functions.

In the majority of the known control systems, where it is desired to selectively control a plurality of different functions, it is necessary that a different switch be included in the input circuit of the system for providing an appropriate signal for controlling each of these functions. Each of the signals is then coupled by a separate transmission line from the input circuit to the actual control circuit for activating the corresponding function. Representative embodiments of such systems are disclosed in U.S. Pat. Nos. 3,312,941 to Booth et al., 3,508,201 to Morale, 3,688,262 to Liquori, and 3,719,828 to Lipskin. Since in each of these devices, there is almost an exact correspondence between the number of input selection members and the number of output functions that can be controlled by the system, there is a direct linear relationship between the control capability of the system and the size of the input device. Thus, as the intended use of the system expands, the size and cost of the control system expands at the same rate. Furthermore, since in each of these systems there is almost always a direct link, i.e. transmission line, between each of the input selecting members and the control circuit, it is difficult to separate the input circuit and the control circuit by any significant distance unless one is willing to utilize a large amount of wiring between the circuits.

The patent to Liquori is possibly of particular interest since the embodiment disclosed by this patent was designed for controlling a plurality of audio-visual devices, which is likewise an area in which the control system of the present invention can be of particular utility. In the system disclosed by the patent to Liquori each of the input buttons is directly connected by a separate line to a remote control assembly, which assembly provides an appropriate output signal that is supplied to each of the audio-visual devices to be controlled.

While several attempts have been made to limit the number of input selecting members which must be utilized in order to control a plurality of control functions, these systems have generally encountered problems of either simultaneously activating a plurality of control functions or entailing such a cumbersome method for avoiding such simultaneous activation that the system becomes impractical. Examples of such systems are disclosed in U.S. Pat. Nos. 3,050,713 to Harmon and 3,569,741 to Bolick et al.

The patent to Harmon discloses a circuit having a plurality of thyratrons that are selectively activated based upon the level of the signal supplied by a signal source. Each of the thyratrons is activated only when an applied input signal is above a corresponding predetermined level. When the thyratron is activated, it generates an output signal for enabling a corresponding control function. Thus for each control function to be activated by the control circuit, it is necessary to have a separate thyratron. In order to prevent simultaneous actuation of more than one thyratron at a time, a plurality of delay circuits is employed. These delay circuits are coupled with the thyratron such that the thyratron which is activated by the lowest level signal is not activated until the longest delay period has passed. Thus the higher the level of the signal, the shorter the time period that signal is applied while conversely the lower the level, the longer the time period the signal is applied. The duration of the applied signals are selected so as to correspond with the delay circuits coupled to the thyratrons so that the signal only exists long enough to activate the appropriate thyratron.

The patent to Bolick et al. discloses a control circuit for selectively activating different operations within a recording device. The circuit includes a plurality of transistors, each of which is activated when the voltage applied to its base is above a predetermined level. In the system disclosed by this patent, if the level of the applied voltage is sufficient to activate the third level transistor, then the first and second level transistors will be simultaneously actuated.

One other control circuit which has been developed in the prior art is that shown in U.S. Pat. No. 3,670,180 to Grossimon et al. In contrast to the systems disclosed in the other patents, however, in accordance with the embodiment disclosed by this patent a plurality of SCRs are sequentially activated by a series of input signals. The values of the input signals sequentially increase and each of the signals serve to actuate a corresponding SCR. The purpose of the control system disclosed by this patent is to fire a series of rockets in a predetermined order and thus the SCRs need only be actuated in accordance with this predetermined order and it is impossible to selectively actuate the SCRs in any other order.

All the systems disclosed by the patents discussed above involve extremely sophisticated and cumbersome circuitry for carrying out a plurality of control functions. If only a relatively few functions are to be controlled by the system, the utilization of separate circuits for each function may not present a significant burden. As the number of functions to be controlled grows, however, the size of the system grows at the same rate thereby increasing the complexity and cost of the system.

SUMMARY OF THE INVENTION

An object of the present invention is to provide a multifunction control system that overcomes the drawbacks of previously known systems as discussed above.

Another object of the present invention is to provide a multi-function control system for selectively enabling one of a plurality of control functions in response to a single input signal.

A further object of the present invention is to provide a control system for selectively enabling a plurality of functions in response to a signal received from an input circuit with the control circuit and input circuit being interconnected by a single transmission line.

Still another object of the present invention is to provide a control system for selectively enabling a plurality of control functions with each control function being actuated in response to a different level voltage applied to the control circuit from an input circuit.

Still a further object of the present invention is to provide a system for selectively providing a plurality of output signals, with each output signal being dependent upon the level of a voltage signal applied within this system, by utilizing a plurality of zener diodes each having a different breakdown voltage so that when each zener diode breaks down, it provides a corresponding output signal.

These objectives are accomplished in accordance with the present invention by the utilization of a control circuit having a plurality of zener diodes with each zener diode having a different breakdown voltage so that each is actuated in dependence upon a different level input signal. The actuation of each higher level zener diode also generates a corresponding blocking signal for blocking the output of the next lower level zener diode so that only a singal output signal is generated by the system. The input signals to the system are generated by an appropriate input circuit which is capable of providing a constant level voltage with the level of the voltage varying in dependence upon which zener diode is to be activated. The input circuit is coupled to the control circuit through a single transmission line over which the constant level voltage is sent to all of the zener diodes of the control circuit.

More specifically, the present invention involves a control system for selectively providing a plurality of control signals, one at a time with each signal serving to enable a separate control function. The selection of the control signals depends upon input signals which are received from an input circuit. Each of the input signals has a constant voltage and the level of the input signal is selected from a plurality of predetermined levels. These input signals are provided to a plurality of zener diode switches. Each of the zener diode switches is activated when the input signal is above a corresponding predetermined level with the predetermined level for each of these zener diodes being different from the level necessary for activating the other zener diodes. Thus, each zener diode which has been actuated provides as appropriate switching signal. The output from each of the zener diodes is in turn coupled to a transistor switching circuit. The output of each zener diode, except for that zener diode corresponding to the lowest voltage level, is also coupled to a lockout circuit which provides a blocking signal when activated. This blocking signal from the lockout circuit is applied to the output of the next lowest level zener diode for blocking that output from reaching the corresponding transistor switching circuit. Thus, if the third level zener diode is actuated, although the first and second level zener diodes are also actuated the lockout circuits block the outputs of those zener diodes from reaching their corresponding transistor switching circuits. Hence, the only transistor switching circuit to receive a signal would be the third level transistor circuit. An output circuit is coupled to each of the transistor switching circuits and in response to a signal from the transistor switching circuits provides an appropriate output signal for enabling an associated control function.

The control system of the present invention has been developed for controlling a plurality of functions. One particular area in which this type of system can be utilized is in connection with controlling a video camera unit and associated equipment within the area surrounding the location of the unit. For example, the output signals from the control circuit can be used for controlling the doors opening into the area, turning on and off the lights, and various movements of the camera such as panning, tilting and zoom control of the camera. The output signals generated by the control circuit can be used for any of a plurality of different functions. It is not mandatory that such functions be control functions, but the signals can be used to provide indications of the selection of certain operations.

DESCRIPTION OF THE PREFERRED EMBODIMENT

Figure 1:
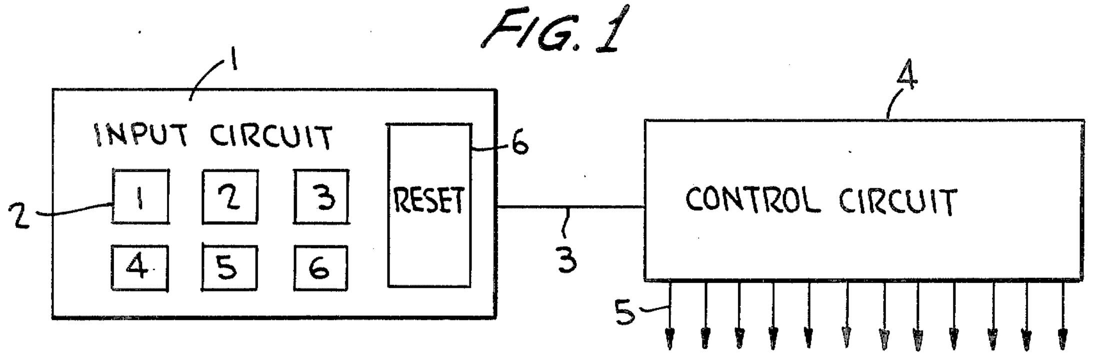
FIG. 1 is a basic block diagram circuit illustrating the two basic circuits of the control system of the present invention.

As shown in FIG. 1, the control system includes two basic circuits, an input circuit 1 and a control circuit 4. The input circuit provides a plurality of constant voltage level signals through transmission line 3 to control circuit 4. In the illustrated embodiment, input circuit 1 is capable of providing seven different voltage signals. The particular signal which is applied is dependent upon which of buttons 2 or reset button 6 is pressed. Thus, the operator of the system presses one of the buttons which then provides an appropriate signal to the control circuit. The control circuit, in dependence upon the input signals that are received, provides an output signal along one of its output lines 5.

Figure 2:
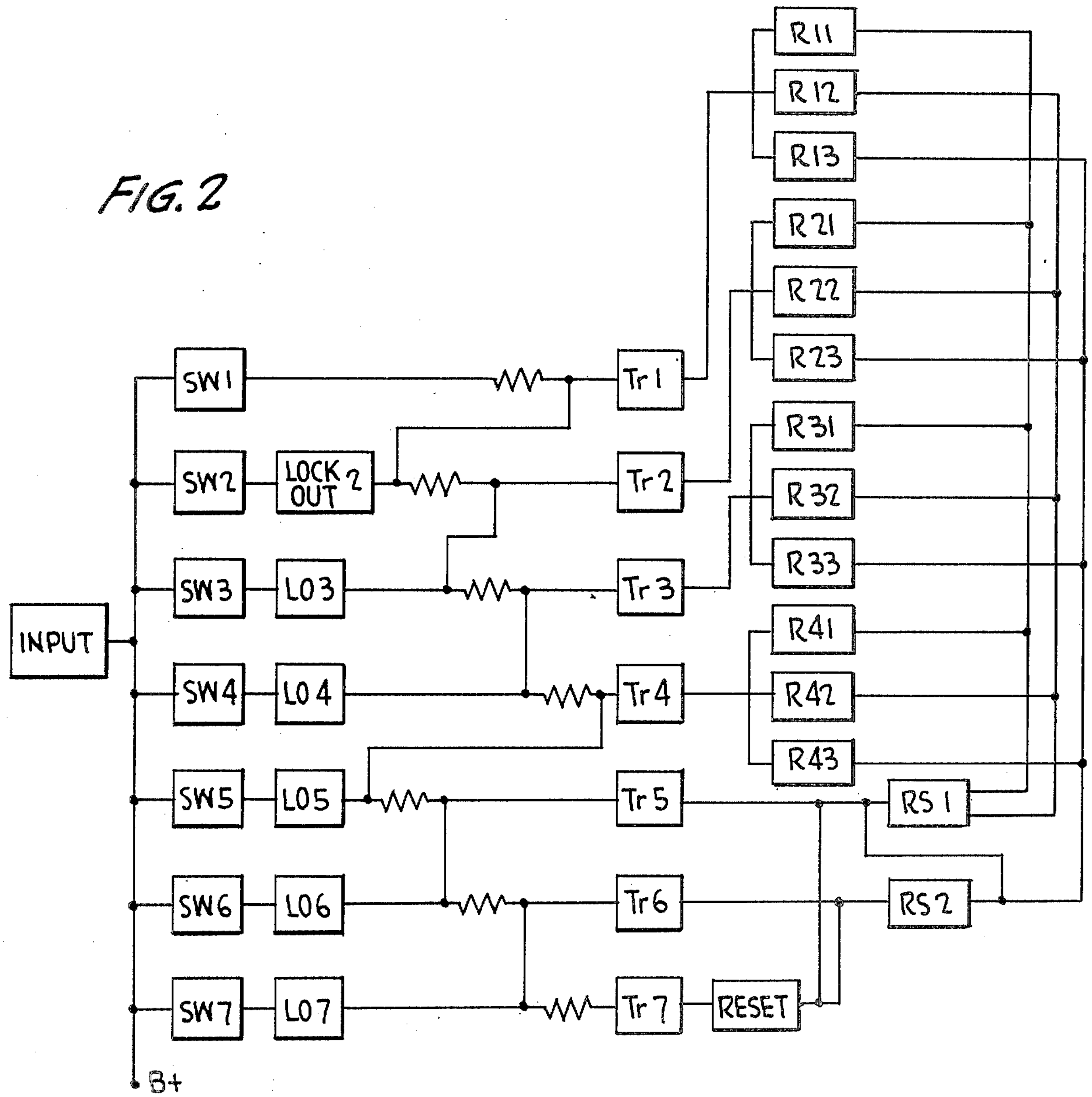
FIG. 2 is a more detailed block diagram circuit of the control system of the present invention.

As shown in FIG. 2, each of the signals from the input circuit is provided to switching circuits SW1 through SW7. Each of these switching circuits is actuated only when the applied voltage is above a certain predetermined level with the predetermined level associated with each switching circuit being different. In the embodiment being shown in FIG. 3, each of the switching circuits is shown to be a zener diode with each zener diode having a different breakdown voltage. In the embodiment illustrated, the breakdown voltage for each of the zener diodes is shown next to the diode. Each of the diodes only passes current when the applied voltage exceeds its breakdown voltage. Thus if a voltage in excess of 7.5 volts is applied, then the first three zener diodes will all conduct current, i.e. switches SW1, SW2 and SW3 will be actuated. The outputs from each of these switches is in turn coupled to a corresponding transistor switching circuit, TR1 through TR7. In the case of the outputs from switching circuits SW2 through SW7, however, the output signal is first fed through a corresponding lockout circuit, LO 2 through LO 7. Each of the lockout circuits upon being actuated provides an appropriate blocking signal which is applied for blocking the output signal from the next lowest level switching circuit. In this manner, only signals from the highest level switching circuit that is actuated pass through to the corresponding transistor switching circuit. In turn, the actuated transistor switching circuit when actuated provides a corresponding output signal.

The output signals from the transistor switching circuits TR1 to TR4 are respectively connected to a group of associated relays R11 to R43; and the output signals of transistor switching circuits TR5 to TR7 are respectively connected to relays RS1, RS2 and a reset relay. Each of the relays upon being actuated provides an appropriate enabling signal for a corresponding control function. Since it is desired to only carry out one control function at a time, separate switching circuitry is included for controlling which of the relays within each group is actuated.

In the embodiment shown in FIG. 2, relays R11, R21, R31 and R41 would normally be actuated by the outputs of the corresponding transistors unless one of the relay switches RS1 or RS2 is first actuated. Thus, if a signal is applied so as to actuate switching circuit SW5, then relay switch RS1 will enable relays R12, R22, R32 and R42 to be actuated. On the other hand, if a signal is supplied for actuating switching circuit SW6, then relay switch RS2 will be actuated for enabling relays R13, R23, R33 and R43 to be actuated. Finally, actuation of switching circuit SW7 will reset relay switches RS1 and RS2 so that the first relay of each group can be actuated. Thus, if one desired to actuate relay R32, it would first be necessary to actuate switching circuit SW5 so that relay switch RS1 enabled relay R32 to be actuated. The next step would be to provide an appropriate signal for actuating switching circuit SW3 which would then provide the actual signal for actuating relay R32.

Figure 3:
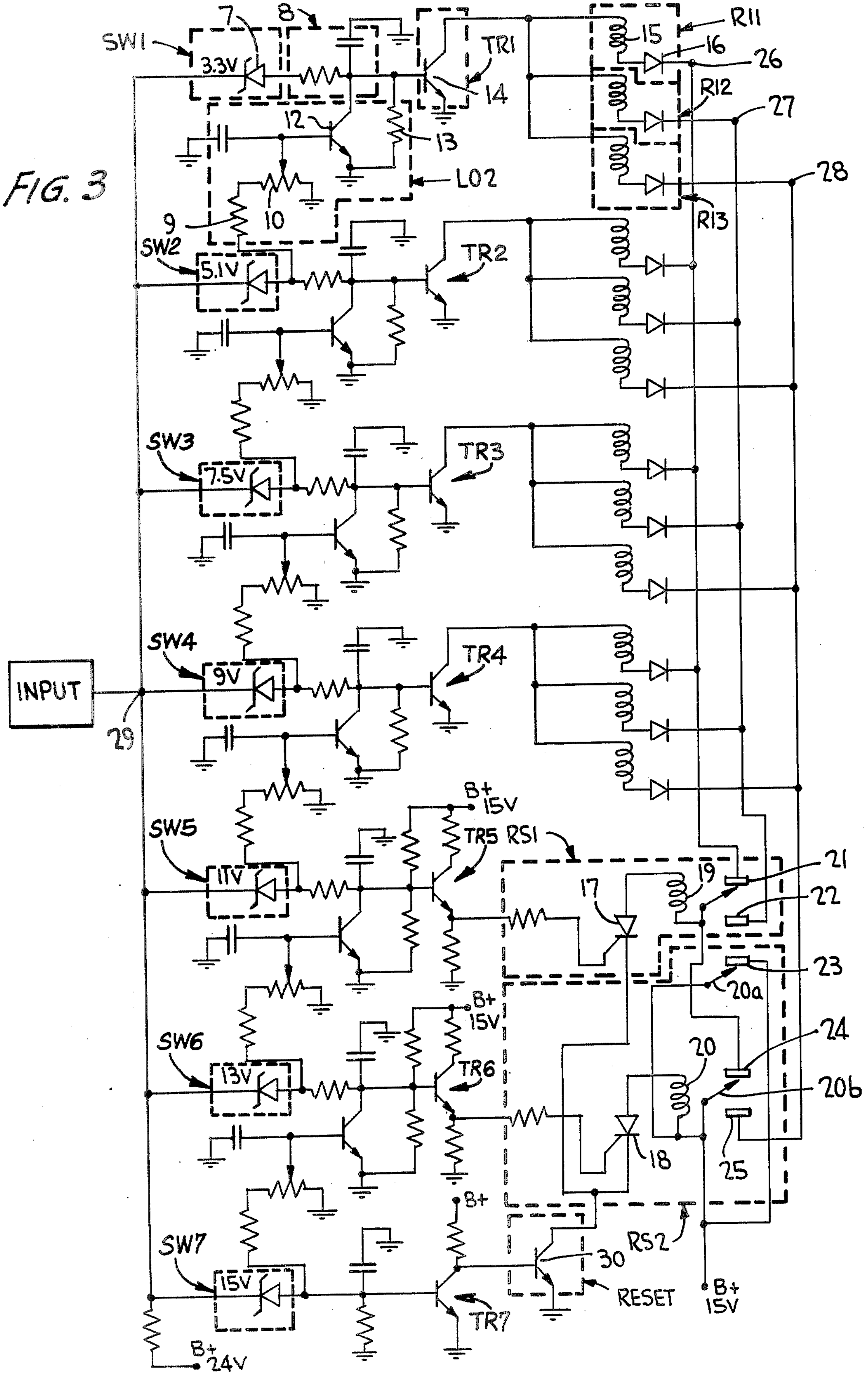
FIG. 3 is a schematic diagram of one embodiment of the control system of the present invention.

Turning to the embodiment shown in FIG. 3, there is an exemplary embodiment of the circuitry that can be utilized in carrying out the present invention. As previously referred to, each of the switching circuits, SW1 through SW7, includes a zener diode 7. Referring to the first switching circuit SW1, it is seen that the output of the zener diode 7 is supplied to transistor switching circuit TR1 after passing through an R-C time constant circuit 8. The time constant circuit allows any transients in the signal to be eliminated prior to applying the signal to the base of transistor 14 of transistor switching circuit TR1. A high gain transistor can be used for transistor 14. The output from the transistor is then coupled to three relay circuits. Relay circuit R11 includes a relay 15 and an isolating diode 16. In dependence upon the output of relay switches RS1 and RS2, one of the relays R11, R12 and R13 will be actuated so as to provide an output current at a respective one of output terminals 26, 27, and 28.

If the voltage signal applied by input circuit 1 to point 29, which is connected to all the zener diodes, is above 5.1 volts, the breakdown voltage of the second zener diode in switch SW2, then the current that passes through that zener diode will supply a signal through lockout circuit LO 2 which serves to block the output of switching circuit SW1 from activating transistor switching circuit TR1. The lockout circuit includes a bias resistor 9 and a further resistor 10 and capacitor 11 which forms an R-C time constant for transistor 12 of the lockout circuit. Resistor 13 serves as a bleeding resistor.

The first four sections of the control circuit are essentially the same except for the breakdown voltages of the zener diodes. In the next two sections, however, in place of the relays which are coupled to the outputs of the transistor switches in the first four sections, these sections include relay switching circuits RS1 and RS2. The last zener diode section is utilized for providing a reset signal for the relay switches.

The relay switches include SCRs 17 and 18 which when fired provide output signals to relays 19 and 20. The switch associated with relay 19 is normally in contact with contact point 21; but upon actuation, relay 19 is switched into contact with contact point 22 so as to enable the second relay of each group of relays to be actuated. Next, two switches, 20*a* and 20*b*, are associated with relay 20. Switch 20*a* is normally in contact with contact point 23 and switch 20*b* is normally in contact with contact point 24 so that the 15 volt B+ is applied for biasing the switch associated with relay 19. When second relay switch RS2 is actuated, switch 20*a* is disconnected from contact point 23 and switch 20*b* is connected to contact 25 thereby enabling the third relay of each group of relays to be actuated. Finally, upon actuation of the highest level zener diode, that diode in switching circuit SW7, reset transistor 30 is actuated and causes relay switches RS1 and RS2 to return to their normal positions.

It is noted that the above description and the accompanying drawings are provided merely to present an exemplary embodiment of the present invention and that additional modifications of such embodiment are possible within the scope of this invention without deviating from the spirit thereof.

I claim:

1. A control system for selectively providing a plurality of control signals, one at a time with each signal serving to enable a separate control function, said system comprising:

(a) input means for providing a plurality of different level voltage signals;

(b) a plurality of first switch means coupled to receive the voltage signals from said input means, each of said first switch means being activated when the voltage signal is above a corresponding predetermined level with the predetermined level for each of said first switch means being different and each of said first switch means providing at its respective output a first switching signal upon being activated;

(c) a plurality of blocking means, each being coupled to the output of a respective one of said first switch means except for said first switch means corresponding to the lowest level input signal, and each of said blocking means providing a blocking signal upon receiving a first switching signal from the corresponding said first switch means;

(d) a plurality of second switch means, each being actuated by a corresponding one of said first switch means and said blocking means associated with said first switch means that is to be activated by the next higher level input signal, each of said second switch means providing at its output a second switching signal upon receiving a first switching signal from the corresponding said first switch means unless said second switch means also receives a blocking signal from the associated said blocking means; and, (e) a plurality of output means, each of said output means being coupled to the output of one of said second switch means and providing an enabling control signal when receiving a second switching signal from the corresponding said second switch means.

2. A system as defined in claim 1, wherein each of said first switch means includes a zener diode having a predetermined breakdown voltage with such breakdown voltage of said zener diode being different from the breakdown voltage of said zener diodes of the other said first switch means such that when said first switch means receives an input signal above the predetermined breakdown voltage of the corresponding said zener diode said first switch means will provide a first switching signal.

3. A system as defined in claim 2, wherein each of said second switch means includes a high gain transistor circuit with a predetermined time constant for eliminating transient oscillations prior to activation of said transistor.

4. A system as defined in claim 1, wherein:

each of said output means includes at least two relays, each of said relays being capable of being selectively actuated in response to a signal from the corresponding said second switch means; and further comprising relay switch means coupled to all of said output means for controlling which of said relays of each of said output means is actuated when said output means receives a second switching signal from said second switch means.

5. A system as defined in claim 4, wherein: said relay switch means is coupled to said input means and is activated by an input signal of a higher level than the levels of signals serving to activate each of said first switch means and said relay switch means upon being activated switches between a first and second position, said relay switch means when in its first position provides at its output a first relay switching signal for enabling a first relay of each of said output means to be activated and when in its second position provides at its output a second relay switching signal for enabling a second relay of each of said output means to be activated; and further comprising a further blocking means coupled to the output of said relay switch means for blocking the first switching signal from said first switching means that is activated by the next lowest level input signal.

6. A system as defined in claim 5, wherein said relay switch means is normally in its first position and is switched into its second position upon receiving an input signal above the appropriate predetermined level; and further comprising reset means for causing said relay switch means to return from its second position to its first position.

7. A system as defined in claim 6, wherein said reset means is coupled to said input means and is activated by a signal of a predetermined level above the level of the input signals needed to activate each of said first switch means and said relay switch means and said reset means upon being activated causes said relay switch means to be reset from its second position to its first position.

8. A system as defined in claim 7, wherein each of said first switch means, said relay switch means and said reset means includes a zener diode, each of said zener diodes being selected so as to pass current at a different breakdown voltage level and each zener diode being coupled to receive the input signal from said input means so as to be activated in dependence upon such input signal.

9. A system for selectively providing a plurality of output signals, said system comprising:

(a) input means for providing a plurality of different level voltage signals;

(b) a plurality of first switch means coupled to receive said voltage signals from said input means, each of said first switching means including a zener diode, each of said zener diodes being selected so as to pass current at a different breakdown voltage level and each zener diode being coupled to receive the voltage signal from said input means so as to be activated thereby so that each of said first switch means is activated when the voltage signal is above a corresponding predetermined level with the predetermined level for each of said first switch means being different and each of said first switch means providing at its respective output a first switching signal upon being activated;

(c) a plurality of blocking means, each being coupled to the output of a respective one of said first switch means except for said first switch means corresponding to the lowest level input signal and each of said blocking means providing a blocking signal upon receiving a first switching signal from the corresponding said first switch means;

(d) a plurality of second switch means, each being actuated by a corresponding one of said first switch means and said blocking means associated with said first switch means that is to be activated by the next higher level input signal, each of said second switch means providing at its output a second switching signal upon receiving a first switching signal from the corresponding said first switch means unless said second switch means also receives a blocking means; and, (e) a plurality of output means, each of said output means being coupled to the output of one of said second switch means and providing an output signal when receiving a second switching signal from the corresponding said second switch means.

* * * * *